United States Patent
Panetta et al.

(10) Patent No.: US 6,966,153 B2
(45) Date of Patent: Nov. 22, 2005

(54) INSULATING COVER

(75) Inventors: Paul Panetta, Lincoln, MA (US); Dave Peterson, Acton, MA (US); Jordan Beaumont, Newton, MA (US)

(73) Assignee: Atticap Corporation, Lincoln, MA (US)

( * ) Notice: Subject to any disclaimer, the term of this patent is extended or adjusted under 35 U.S.C. 154(b) by 87 days.

(21) Appl. No.: 10/165,889

(22) Filed: Jun. 10, 2002

(65) Prior Publication Data

US 2002/0190070 A1 Dec. 19, 2002

Related U.S. Application Data

(60) Provisional application No. 60/298,352, filed on Jun. 16, 2001.

(51) Int. Cl.[7] .............................................. E02D 29/14
(52) U.S. Cl. .................. 52/19; 52/3; 52/23; 52/202; 52/404.1; 52/407.1; 52/405.1; 49/463; 160/180; 182/46; 182/77
(58) Field of Search ...................... 52/3, 19, 23, 404.1, 52/39, 186, 202–203, 405.1, 407.1, 406.1, 52/794.1, 407.2; 182/77–81, 82, 83, 230, 182/46, 47; 312/100–102; 49/463; 160/180, 160/DIG. 18

(56) References Cited

U.S. PATENT DOCUMENTS

| | | | |
|---|---|---|---|
| 4,281,743 A | 8/1981 | Fuller | |
| 4,299,059 A | 11/1981 | Smith | |
| 4,550,534 A | 11/1985 | Mariano et al. | |
| 4,563,845 A | 1/1986 | Stipe | |
| 4,928,441 A * | 5/1990 | Daley | 52/19 |
| 5,274,966 A * | 1/1994 | Daley | 52/23 |
| 5,378,078 A * | 1/1995 | Lewis et al. | 404/25 |
| 5,481,833 A * | 1/1996 | Williams | 52/19 |
| 5,628,151 A * | 5/1997 | Monat | 52/19 |
| 5,867,946 A * | 2/1999 | Seagren | 52/19 |
| 5,953,866 A * | 9/1999 | Poole | 52/169.6 |
| 6,014,841 A * | 1/2000 | McCoy et al. | 52/19 |
| RE36,975 E * | 12/2000 | Williams | 52/19 |
| 6,601,352 B1 * | 8/2003 | Obermeyer et al. | 52/202 |

OTHER PUBLICATIONS

Copy of first page of website www.thermalid.com, Thermal-A-Lid.
Copy of first page of website, www.insulsure.com.
Copy of first page of website, www.birdzone.com.
Copy of first page of website, www.atticcap.com.

* cited by examiner

*Primary Examiner*—Jeanette Chapman
(74) *Attorney, Agent, or Firm*—Daly, Crowley, Mofford & Durkee, LLP

(57) ABSTRACT

A thermal insulating cover is presented. The cover includes a top, a plurality of sides extending from the top and a wide base perimeter extending from the plurality of sides. The device may be formed as a unitary piece, or may be provided in two or more sections which are easily assembled together. A piece of foam, acting as a gasket may be affixed to the base perimeter.

11 Claims, 4 Drawing Sheets

INSULATING COVER

CROSS REFERENCE TO RELATED APPLICATIONS

This application claims priority under 35 U.S.C. §119(e) to provisional patent application Ser. No. 60/298,352 filed Jun. 16, 2001; the disclosure of which is incorporated by reference herein.

BACKGROUND OF THE INVENTION

Typically a set of folding stairs is provided in the ceiling to allow walk-up access to the attic. A problem associated with this arrangement is the lack of insulation provided between the attic and the room below when the stairs are in their folded position. Typically, this opening is left uninsulated since the folding stairs occupy the space where insulation would normally reside. This results in a loss of heat and/or cooling from the room below the attic opening into the attic.

Devices have been developed which attempt to cover the pull-down stairs in an attic, however these devices have limitations which affect their use. One such device is shown in U.S. Pat. No. 4,281,743 to Fuller (hereinafter Fuller). The device of Fuller comprises multiple pieces having overlapping tongue-and-groove sections. The Fuller device thus requires assembly of its interlocked structure. The use of multiple pieces can reduce the overall thermal efficiency, as well as affect the strength and rigidity of the cover. The Fuller device may also come apart, and may requires use of a binding strap to keep the unit whole, as discussed on column 7, lines 17–28.

Another attempt to solve the problem of thermal loss through an attic access way is shown in U.S. Pat. No. 4,299,059 to Smith (hereinafter Smith). Smith discloses an insulated, fire resistant attic door. In Smith, the pull-down door that supports at least a part of the folding stairway includes a layer of insulative material. The Smith device cannot be used in previously installed pull-down stairways, and would thus be labor intensive to install as well as incur significant cost to retrofit existing pull-down stairways.

U.S. Pat. No. 4,550,534 to Mariano et al. (hereinafter Mariano) is another attempt to solve the problem of thermal loss through an attic access way. The device of Mariano includes a hinged cover, a latching mechanism and a leaf spring. The Mariano device thus requires mechanical installation, and has several moving parts which can wear out or otherwise fail.

U.S. Pat. No. 4,563,845 to Stipe (hereinafter Stipe) comprises a cover which is attached to the ceiling side of the door of the pull-down stairway. The Stipe device thus extends into the room having the attic opening, providing an extended portion of the ceiling, and making the presence of the attic access way much more noticeable.

Devices available from Atticcap (www.atticcap.com) and from Thermalid (www.thermalid.com) are only useful in attics having a finished floor. These devices have narrow base structures which rely on the attic having a finished floor in order to provide the thermal barrier. For attics having unfinished floors, these devices do not provide a continuous thermal barrier.

Additional devices such as the Attic Tent available from Insulsure (www.insulsure.com) comprise a tent-like structure. A base portion is mechanically attached to the attic floor, and a hood is attached to the base portion by a zipper. This makes the device difficult to close and open since the hood portion must be unzippered to access the attic and then zippered to close the attic opening. Zippers can jam and break, rendering the attic space unusable. There may additionally be thermal loss through the zipper structure.

Birdzone (www.birdzone.com) produces a folding attic stair insulator comprising a backbone of PVC piping to with fabric is attached to provide the cover. The Birdzone device requires assembly and installation. Since the device is not rigid in structure, the fabric could easily become damaged during removal and installation of the insulator, thus reducing the thermal insulation provided by the device.

In view of the foregoing it would be desirable to provide a rigid insulating cover which fits over an access opening to an attic or other space and provides a thermal barrier in order to prevent or minimize the loss of heat or cooling air from a room into the attic. It would be further desirable to provide such a cover which is also easy to install, easily moved when necessary, and which is useful for both finished attic floors and unfinished attic floors and which has a low profile.

SUMMARY OF THE INVENTION

With the foregoing background in mind, it is an object of the present invention to provide a rigid thermal insulating cover having a top, a plurality of sides extending from the top and a wide base perimeter extending from the plurality of sides. The device may be formed as a unitary piece, or may be provided in two or more sections which are easily assembled together. A piece of foam, acting as a gasket, may be affixed to the base perimeter.

BRIEF DESCRIPTION OF THE DRAWINGS

The invention will be better understood by reference to the following more detailed description and accompanying drawings in which.

DETAILED DESCRIPTION

An insulating cover is presented. The cover is comprised of an insulating material such as closed cell foam, and is designed to fit over an opening such that the cover provides an insulating barrier between two areas separated by the opening.

In a preferred embodiment the cover is used to insulate the opening associated in a ceiling which allows access to an attic. Typically a set of folding stairs is provided in the ceiling to allow walk-up access to the attic. A problem associated with this arrangement is the lack of insulation provided between the attic and the room below when the stairs are in their folded position. Typically, this opening is left uninsulated since the folding stairs occupy the space where insulation would normally reside.

The present invention overcomes this problem by providing a rigid cover which overlaps the opening used by the folding stairs and by having a raised portion which fits over the folding stairs when they are in the folded position, such that a continuous thermal barrier is provided between the attic and the space below.

Figure 1:
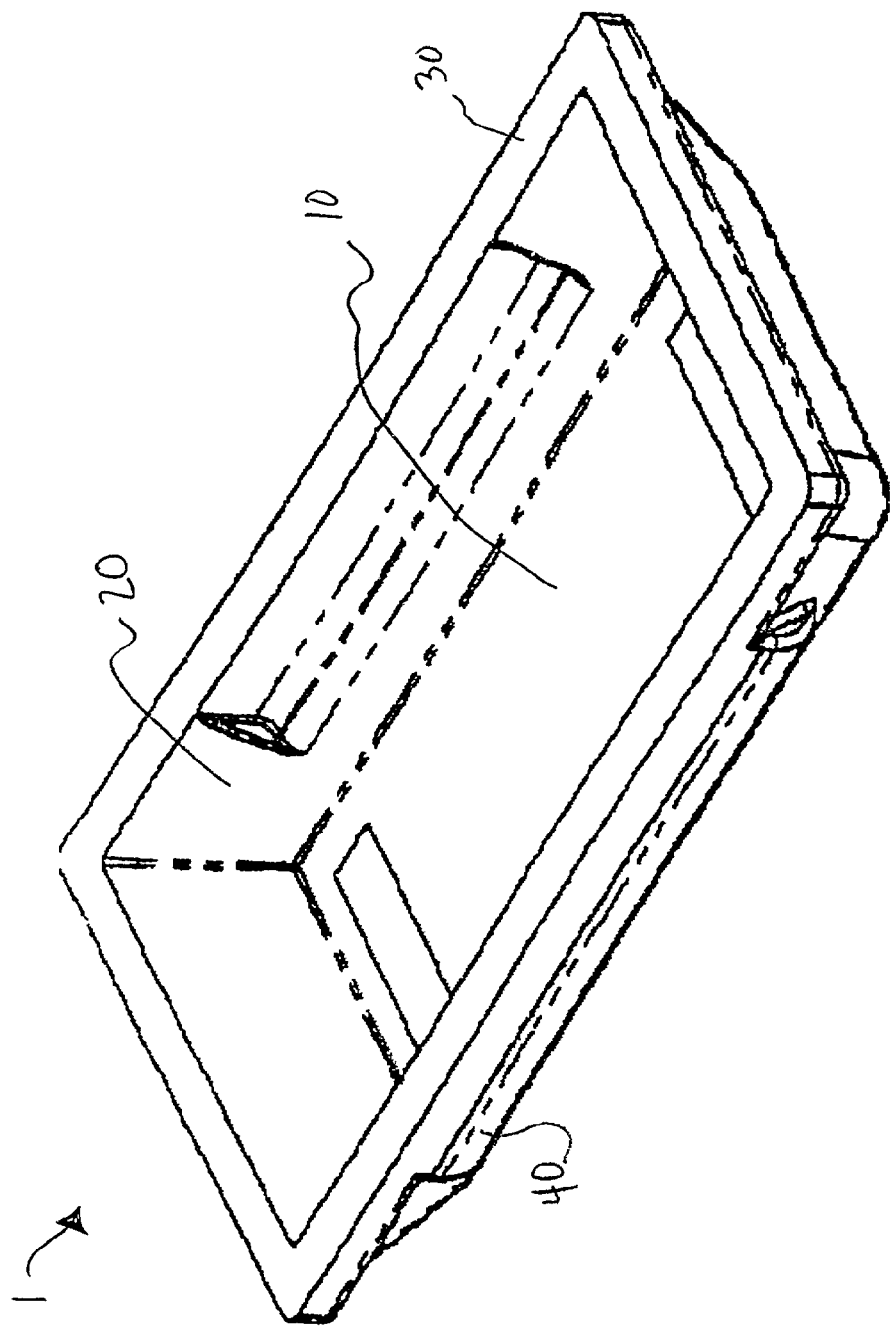
FIG. 1 is an isometric view of the insulting cover of the present invention.
Figure 2:
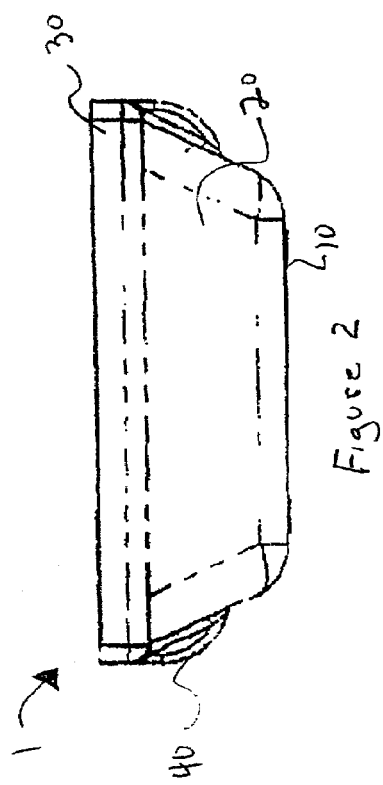
FIG. 2 is an end view of the insulating cover of FIG. 1.
Figure 3:
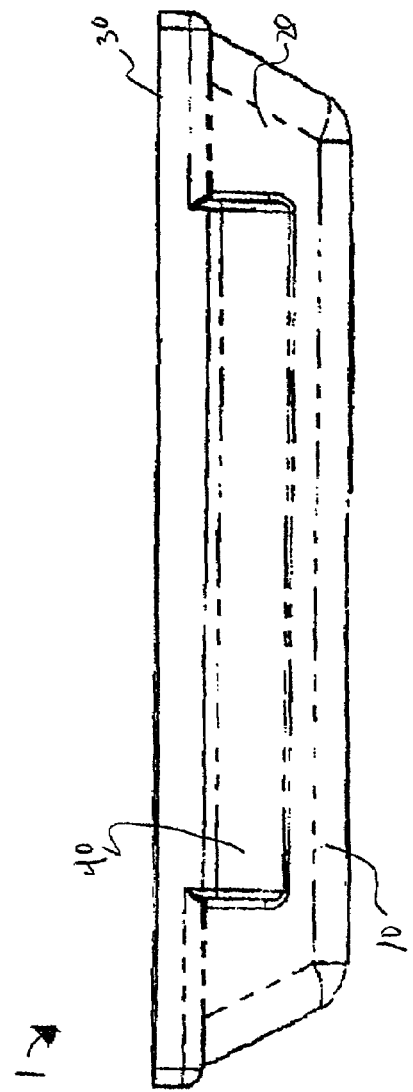
FIG. 3 is a side view of the insulating cover of FIG. 1.
Figure 4:
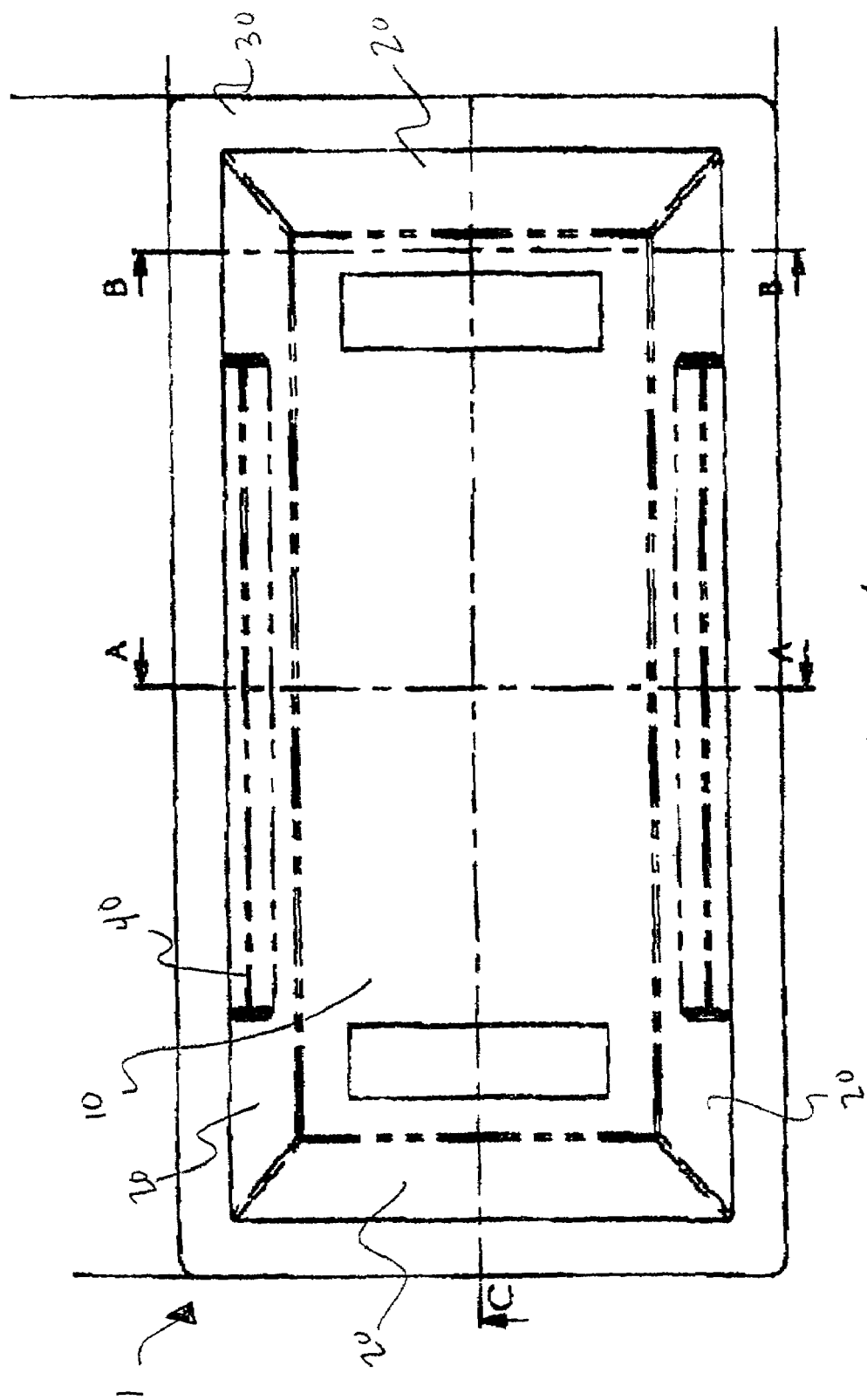
FIG. 4 is a bottom view of the insulating cover of FIG. 1.
Figure 4A:
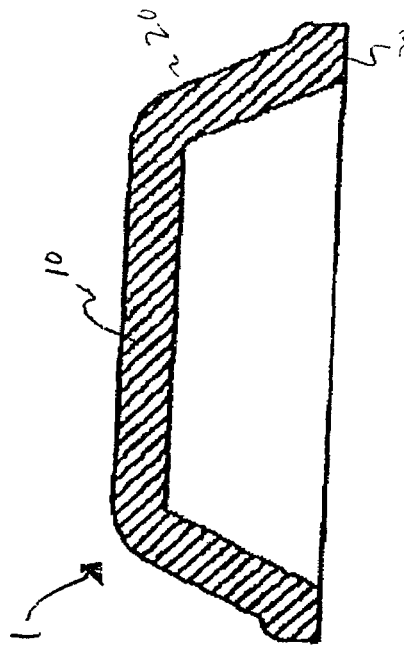
FIG. 4A is a cross-sectional view of the cover of FIG. 4 taken across line AA.
Figure 4B:
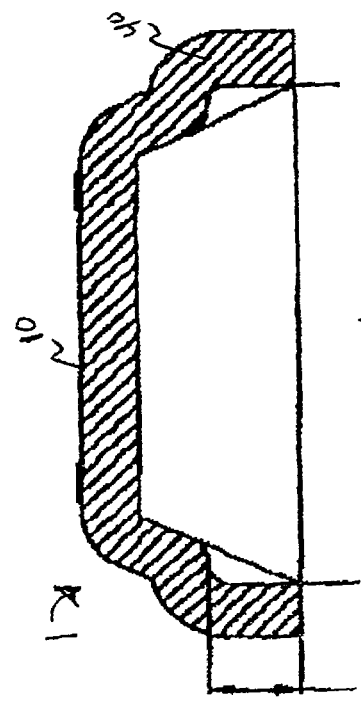
FIG. 4B is a cross-sectional view of the cover of FIG. 4 taken across line BB.
Figure 4C:
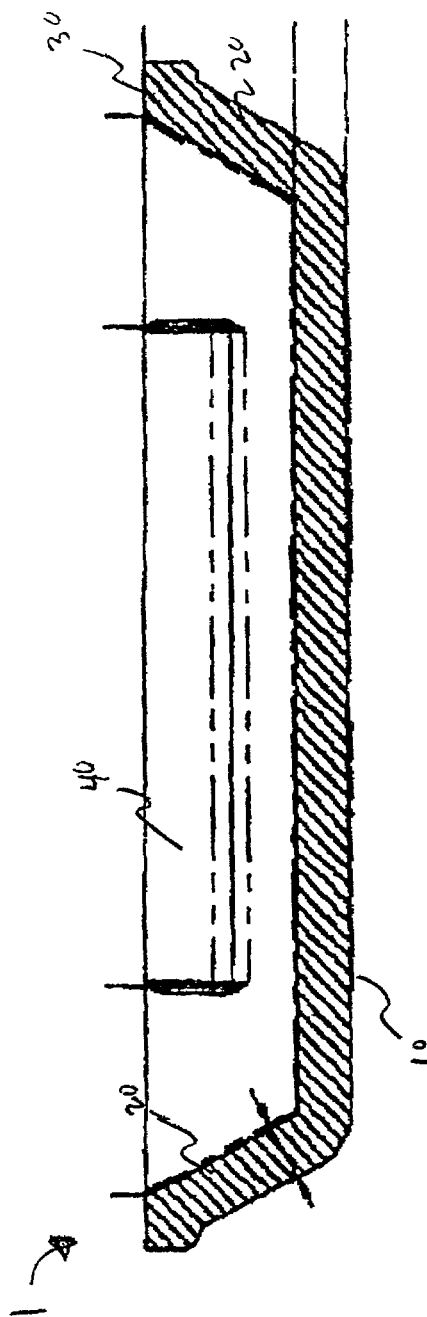
FIG. 4C is a cross-sectional view of the cover of FIG. 4 taken across line CC.

Referring to FIGS. 1–4C in which like elements are provided having like reference designations throughout the several views, the cover 1 features a large flat rectangular base perimeter 30 which allows the cover 1 to rest on the floor of the attic. Having a wide base perimeter 30 enables the cover to work with both finished and unfinished attic areas. Extending from the base are four sloping sidewalls 20 which extend to a flat rectangular top 10. The sloping sidewalls 20 are preferred as they allow for stacking of covers one on top of the other (e.g. for storage in a retail store) as well as providing a certain degree of rigidity. Alternately, generally vertical sidewalls could also be used. While a generally flat top portion 10 is shown in the figures, the top could be curved, domed, or pointed as well.

The cover 1 further includes a protuberance 40 in two of the sidewalls. The protuberances 40 are designed to fit over parts of the folding stairs when the stairs are in the folded position. The protuberances 40 allow the overall height of the cover to be minimized, thus reducing the overall size of the cover. The low profile allows the cover to be disposed over attic openings even when the opening is in an area of the attic where the roof limits the amount of space above the opening.

In a preferred embodiment, the cover is comprised of a unitary piece of material. With such an arrangement there is no assembly required, making the device simple to use and install. The cover is placed over the opening, with no need to mechanically fasten the cover to the attic or around the opening. When access to the attic is desired, the cover can be easily moved from its position over the opening with a minimal amount of effort. The cover also features no moving parts, thus there is no need for maintenance, and nothing to wear out or be replaced.

In an alternate embodiment the cover may be provided in two or more pieces. The pieces are then joined together to form the resulting cover. The pieces may be joined together mechanically, by an adhesive or tape, or by any means known to those of general skill in the art. One reason for providing the cover in multiple pieces is to make the device easier to ship to customers.

A strip of material may be provided which is attached to the bottom surface of the base perimeter. The material, such as a soft foam material, functions as a gasket between the attic floor and the bottom of the base perimeter. This piece would provide additional thermal protection for any unevenness in the attic floor when the cover is installed.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. An insulating cover to cover an attic side of an attic ceiling opening, comprising:
   a top portion;
   a plurality of sidewalls extending from said top portion; and
   an extended base perimeter extending from said plurality of sidewalls, wherein said plurality of sidewalls, said top portion, and said extended base perimeter define a cavity having a cavity inner surface, and wherein said top portion, said plurality of side walls, and said extended base perimeter are provided as a unitary piece consisting of an insulating foam material, and wherein the cavity inner surface includes at least one depression disposed in a respective at least one of the plurality of sidewalls and adapted to fit a substantial portion of an edge of a side rail of a folding stair associated with the attic opening.

2. The cover of claim 1 wherein the insulating foam material comprises rigid closed cell foam.

3. The cover of claim 1 further comprising a gasket extending along at least a portion of said base perimeter.

4. The cover of claim 1 wherein said sidewalls are generally perpendicular to said top portion.

5. The cover of claim 1 wherein said sidewalls are non-perpendicular to said top portion.

6. The cover of claim 1 wherein said top portion is generally flat.

7. The cover of claim 1 wherein said top portion is generally curved.

8. An insulating cover to cover an attic side of an attic ceiling opening, comprising:
   a top portion consisting of a single layer of an insulating foam material;
   a plurality of sidewalls extending from said top portion, each of said plurality of sidewalls consisting of a single layer of the insulating foam material; and
   an extended base perimeter consisting of a single layer of the insulating foam material extending from said plurality of sidewalls, wherein said plurality of sidewalls, said top portion, and said extended base perimeter define a cavity having a cavity inner surface, and wherein said top portion, said plurality of side walls, and said extended base perimeter are provided as a unitary piece consisting of the insulating foam material, and wherein the cavity inner surface includes at least one depression disposed in a respective at least one of the plurality of sidewalls and adapted to fit a substantial portion of an edge of a side rail of a folding stair associated with the attic opening.

9. The cover of claim 8, wherein the insulating foam material comprises rigid closed cell foam.

10. The cover of claim 8, wherein the extended base perimeter is below the top portion when the cover is mounted to the attic ceiling opening.

11. The cover of claim 1, wherein the extended base perimeter is below the top portion when the cover is mounted to the attic ceiling opening.

* * * * *